Patented June 21, 1932

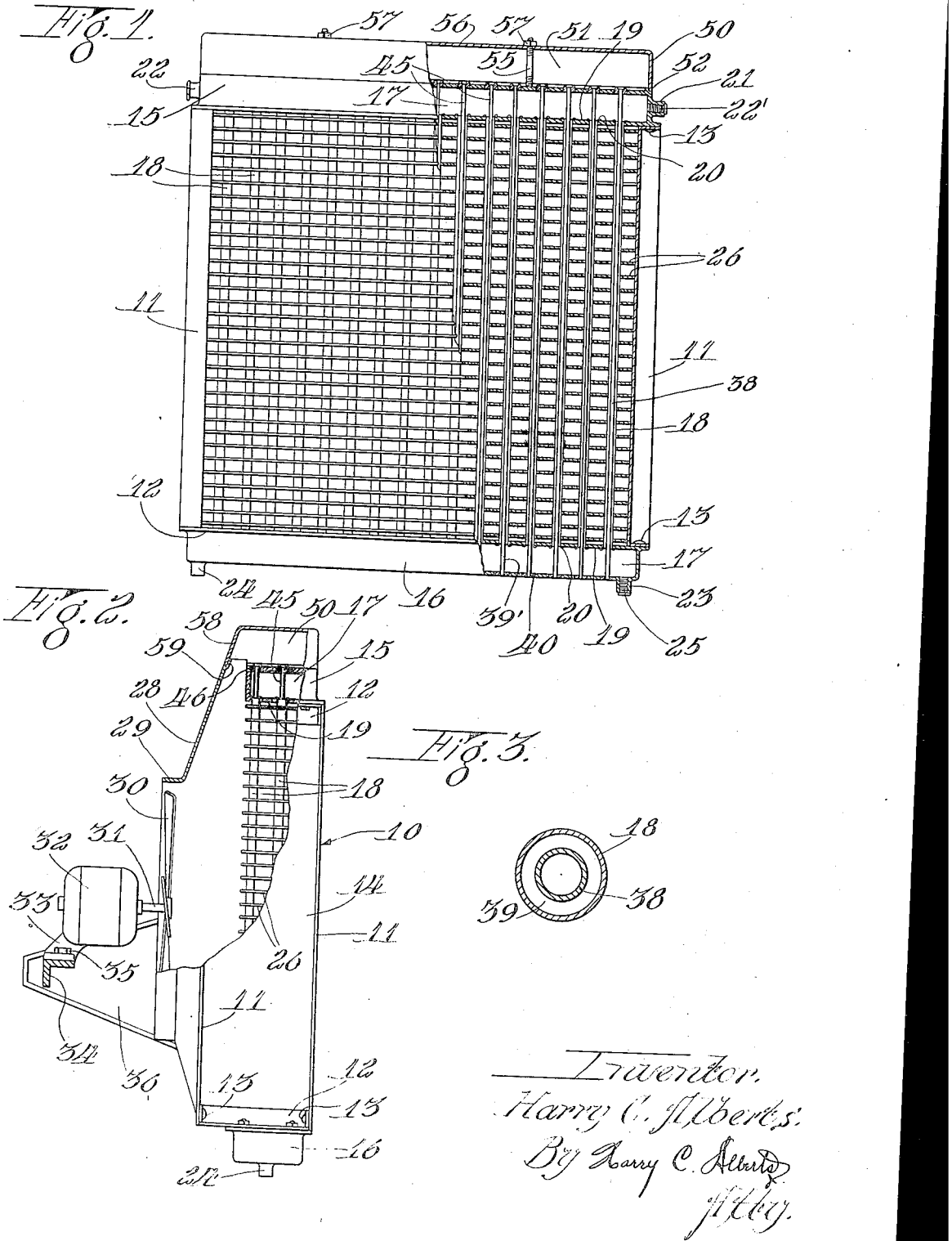
June 21, 1932.  H. C. ALBERTS  1,863,554
HEAT RADIATOR
Filed March 5, 1929  2 Sheets-Sheet 1

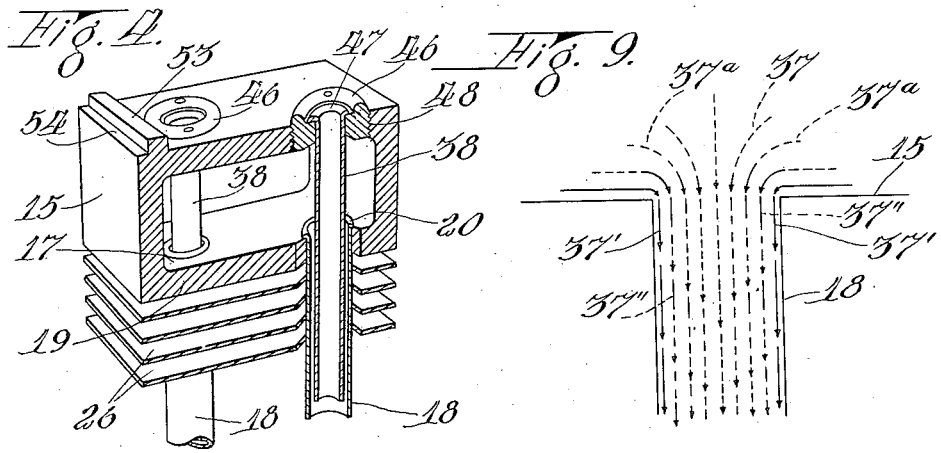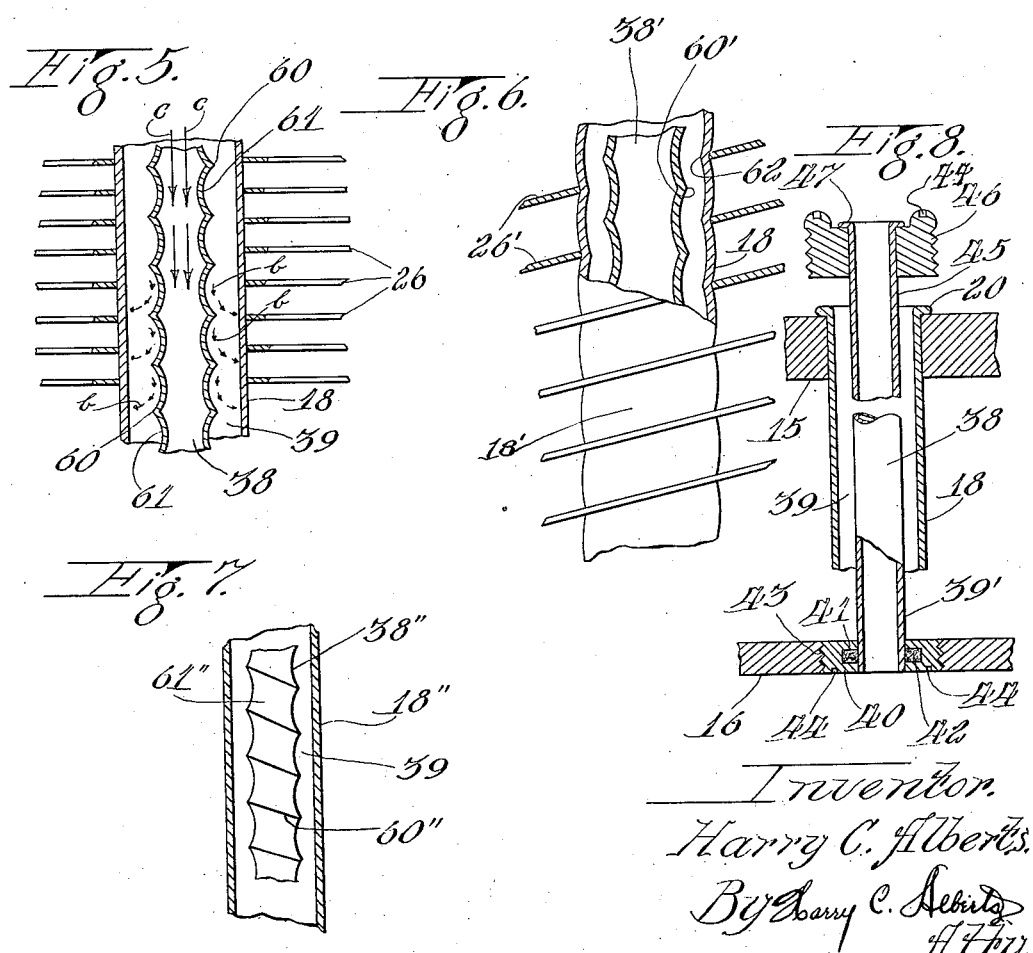

1,863,554

UNITED STATES PATENT OFFICE

HARRY C. ALBERTS, OF CHICAGO, ILLINOIS

HEAT RADIATOR

Application filed March 5, 1929. Serial No. 344,263.

This invention relates to heat radiating devices and more particularly to improvements therein for increasing the thermal efficiency thereof.

It contemplates more especially the provision of novel means for increasing heat conduction, radiation and consequent transmission to the atmosphere for heating purposes from radiators of the blower type.

Heating devices of numerous types have heretofore been employed for domestic and commercial purposes, but these are not entirely satisfactory or reasonably efficient to warrant their general adoption, although heat radiating units equipped with blowers have been successfully employed in garages, halls, shops and similar situations of considerable expanse.

The heat radiating units equipped with blowers largely employ steam as a heat medium, and the efficiency thereof depends upon the ability to absorb the maximum heat therefrom for transmission to the confined atmosphere of a room. With known units of this type, the heat medium is conveyed through tubes having transversely secured heat radiating plates disposed in the path of the blower. The air currents from the blower carry the heat from the plates into the room to continuously warm the cold air therein.

Now, then, with the passage of the steam through the tubes, the vapor particles or molecules pursuing the lanes adjacent the interior walls thereof readily lose their heat thereto. The vapor molecules passing through more distant to the walls of the tubes, release less heat owing to the insulating effect of the molecules adjacent the walls and also because of their passage with increased speed with respect to the adjacent molecules which are retarded by the surface friction offered by the interior walls. The molecules traveling lanes still further distant from the walls have a still greater velocity which increases proportionally with respect to the radial distance from the walls of the tubes, reaching a maximum along the axial lane of travel where heat conduction, radiation and transmission to the walls of the tubes is negligible.

While this principle perhaps has long been recognized, yet suitable practical means have not thus far been devised for the effective utilization thereof, thereby overcoming the poor thermal effects existent in the ordinary passage of heat through tubes. This phenomena is less pronounced in heat tubes of comparatively small diameter, but nevertheless is existent therein. Small diameter tubes are objectional, however, in that the radiating surfaces thereof are exceedingly small and for that reason the advantages accruing therefrom are offset or at least negligible. With the teachings of the instant invention the tube radiating surfaces may be materially increased, and further heat absorption accomplished to a much greater extent owing to the provision of a concentric lane of passage for the heat immediately adjacent the interior walls of the tubes.

One object of the present invention is to increase the efficiency of heating devices of the character mentioned.

Another object is to provide improved means for effecting more complete absorption from a heating medium.

Still another object is the provision of means for increasing heat absorption and radiation with diminished consumption of the heat medium.

A further object is the provision of means for guiding the passage of heat through tubes so as to effect increased absorption by the radiating surfaces thereof.

A still further object is the provision of tubes prescribing a tortuous path for the conveyance of heat therethrough with maximum radiation to the walls thereof.

Still a further object is the provision of means for effecting maximum absorption of heat by passing a vapor medium exteriorly and interiorly of a tube coincident with the conveyance of a heat medium therethrough.

Other objects and advantages will appear from the illustrative embodiment of the present invention.

In the drawings:—

Figure 1 is a fragmentary sectional front view in elevation of a device embodying features of the present invention.

Figure 2 is a fragmentary sectional side view in elevation of the device disclosed in Figure 1.

Figure 3 is a cross-sectional view of a tube employed in connection with the device disclosed in the preceding views.

Figure 4 is a fragmentary end perspective view disclosing the intake steam header and radiating tubes with their plates secured thereto.

Figure 5 is a vertical section of a fragmentary tube provided with fins or irregularities to produce turbulency and provide increased radiating surfaces.

Figure 6 is a fragmentary sectional view of a modified tube and helical radiating plate arrangement therearound with irregular tube surfaces interiorly and exteriorly.

Figure 7 is a sectional view in elevation of a still further modified form of tubes having an irregular surfaced interior tube of helical design.

Figure 8 is an enlarged fragmentary sectional view showing the manner in which the exterior steam tube and interior air tubes are secured to their respective headers.

Figure 9 is a diagrammatic view showing the manner in which a heat medium is conveyed through an ordinary tube.

The structure selected for illustration comprises a frame 10 of any suitable construction, in this instance constituting parallel disposed, vertical corner angle irons 11 having cross angle irons 12 disposed therebetween proximate to the top and bottom edges thereof for intersecural by any suitable fasteners such as the rivets 13 to provide a rigid frame structure. Sheet metal side walls 14 are secured to the angle irons 11 and 12 in the customary manner to serve as an enclosure or casing for the radiating element to be hereinafter described.

In order to control the effective passage of steam or other heat medium through the interior of the frame casing, an intake header 15 and discharge header 16 are bolted or otherwise secured to the angle irons 12 at the top and bottom thereof, respectively, in spaced confronting relation. These headers preferably comprise a rectangular casting approximating the width of the frame 10 so that the chambered interiors 17 thereof may be in alignment to effect the passage of steam or other heat carrying medium from one to the other through suitable passages provided to absorb the heat for radiation to the confined atmosphere of a room to be heated.

To this end, a plurality of copper or other metallic heat tubes 18 are disposed between the headers 15 and 16 preferably in staggered relation for attachment thereto in a manner to communicate with the interiors 17 thereof. The tubes 18 have, therefore, the extremities thereof projecting through the confronting horizontal walls 19 of the headers 15 and 16 so as to enable a beaded joinder therewith by swaging, rolling or other known methods of commercial practice to provide a secure, non-leakable connection therebetween in the form of a bead 20. A pair of bosses 21 and 22 are, in this instance formed integral with the end walls of the intake header 15 so that steam or any other heat carrying medium may be conveyed thereto from a suitable heat source through one or the other of the bosses 21 and 22 which will most conveniently serve as an intake orifice for a particular installation. The orifice 21 or 22 which is not connected to the steam line or heat source is sealed by means of a threaded plug 22' of standard construction.

The discharge header 16 is also provided with a pair of orifices defined by depending bosses 23 and 24 integrally formed in the bottom thereof to enable the connection of suitable piping to one or the other for conveying the heat medium to the feeder or return line of the heating system. These bosses 23 and 24 are likewise internally threaded to receive correspondingly threaded plugs 25 which seal one or the other depending upon the particular orifice which is most convenient for connection in any particular installation. As a consequence, steam is supplied to the header 15 for conveyance or passage through the tubes 18 to ultimately discharge into the header 16 subsequent to the conduction of the heat therefrom to the metallic tubes 18 incident to the passage of the heat medium therethrough. In order that the heat conducted to the metallic walls of the tubes 18 may be most effectively radiated, a plurality of plates or fins 26 are disposed transversely of the tubes 18 in parallel spaced relation to constitute extended radiating surfaces therefor in parallelism to the headers 15 and 16, these approximating the dimensions of the frame casing in size for ready reception therein.

These plates or fins 26 are preferably composed of copper or other efficient heat conducting metal which resists corrosion and oxidation. These superposed heat radiating plates 26 are secured to the tubes 18 in any suitable manner as commercial practice may dictate to establish a secure joinder therewith so that the heat may readily be conducted from the tubes to the plates constituting a fin radiating construction known in the art.

The heat is radiated from the plates or fins 26 and carried into a room or other space of considerable expanse by natural draft or preferably a blower of the fan type which is associated therewith in the rearward region thereof to blow air in lanes parallel to the surfaces of the fins 26 to establish a draft therebetween which will carry the heat therefrom to the atmosphere of a room or other confined space. The frame 10 is, in this instance, provided with a rear wall 28 constructed of sheet material with an outwardly tapering central portion which terminates in a horizontally disposed, circular flange 29 defining an opening having a diameter somewhat greater than the radial blades of a fan 30 of standard construction. The rear wall 28 is fastened to the angle irons 11 and 12 constituting the rear framework in continuity with the side walls 14.

The fan 30 is mounted on a shaft 31 constituting the armature of an electric motor 32 which has a depending bracket 33 formed on the casing thereof. The bracket 33 is bolted or otherwise secured to a cross brace 34 by means of fasteners 35 to enable the detachable secural of the motor 32 thereto. The cross brace 34 is anchored between rearwardly projecting brackets 36 preferably of triangular form having the bases thereof secured to the vertically disposed rear angle irons 11 to effect a rigid joinder therebetween. The motor 32 is connected to any suitable power source so that it may be selectively energized to rotate the fan 30 at a sufficient speed to establish the flow of air from the room between the fins or plates 26 to carry the heat therefrom. The heat is conducted thereto incident to the passage of steam or other heat mediums through the tubes 18 from the intake header 15 to the exhaust header 16.

It will be apparent that the steam or other heat medium flowing through the tubes 18 may be assumed to travel in parallel lanes represented diagrammatically by the arrows 37 (Figure 9). As a consequence, the heat carried by the particles of steam represented by the solid arrows 37′ which travel adjacent the walls of the tubes 18, will practically be completely conducted to the tubes for eventual conduction to and radiation from the fins 26 transversely secured thereto, since its velocity is retarded by the friction of the tube walls aside from being in direct contact which enables most effective conduction. The steam particles traveling the next lane 37″ will flow somewhat faster owing to the decreased resistance offered by the neighboring particles compared to the wall resistance, and these lose less heat to the tubes 18 in that the first lane of particles 37′ serve as a partial insulator. Further, these travel more remote from the walls of the tubes 18 with increased speed which does not permit of the same amount of absorption or conduction to the extent experienced by the flow of particles directly adjacent thereto. Now, then, the heat medium particles 37a traveling more remote from the walls of the tubes 18 have a still further increased speed and as a result lose still less heat to the tubes 18 while the particles of steam following a central or axial lane will pass therethrough still faster and practically without losing any heat whatsoever. In view thereof, much heat is lost in the passage of its carrying medium through tubes from the intake header 15 to the exhaust header 16.

The present invention contemplates the reduction of this heat loss to a minimum, thereby materially increasing the efficiency of heating units by the provision of means which will confine the flow of steam proximate to the interior surfaces of the tubes 18. This may be accomplished by providing tubular members 38 axially within the tubes 18 to define concentric passages 39 of comparatively small radial thickness to accommodate the flow of steam through the tubes 18 in direct or at least very proximate relation with the interior walls of the tubes 18 so that an exceedingly large proportion of heat per unit flow will be absorbed from the steam than otherwise. This is obvious in that the particles of steam or other heat mediums will flow for the most part in contact with the walls of the tubes 18, thereby conducting its heat thereto for distribution to the plates or fins 26 from which it is radiated by either natural or forced draft in a manner discussed supra. This also enables the efficient use of heat tubes having larger diameter and proportionally still larger circumferential radiating surface areas.

The interior tubular members 38 preferably are exposed to the atmosphere in that the lower extremities 39′ thereof pass through the discharge header 16 for reception by axially aligned threaded plugs 40 having annular grooves 41 therein to receive a packing 42 which frictionally engages the walls of the tubular members 38 to prevent the leakage of steam or condensate which may accumulate in the exhaust header 16. This is accomplished by providing threaded apertures 43 in alignment with the tubes 18 to threadedly receive the plugs 40. So that the plugs 40 may be readily turned or adjusted, the end faces thereof are provided with diametrically aligned holes 44 to receive a suitable wrench to effect the engagement or disengagement of the plugs 40 with respect to the wall of the header 16. The other extreme regions 45 of the tubular members 38 project through the intake header 15 and terminate in threaded annular plugs 46 which are swaged or otherwise secured thereto to preferably form a bead 47 establishing a rigid joinder therewith. The plugs 46 engage correspondingly threaded apertures 48 provided in the top wall of the header 15 in alignment with each of the tubes 18 to maintain the tubular members 38 in concentric relation therewith, and further to permit access thereto for cleansing or repair purposes.

The tubular members 38 terminate in the top wall of the header 15 to enable the establishment of communication with the atmosphere or preferably an air header 50 which is stamped or otherwise shaped from sheet material to provide an air chamber 51 therein. The air header 51 has its mouth defining peripheral edge 52 resting on the intake steam header 15, these being kept in alignment against lateral movement by means of flanges 53 integrally or otherwise formed on the top surface of the header 15 to define a resting edge 54 for the air header 50. The air header 50 is detachably associated with steam header 15 by means of upstanding bolts 55 which are anchored in the top wall of the steam header 15 to project through aligned apertures provided in the confronting wall 56 of the air header 50. Threaded nuts 57 engage the bolts 55 to maintain the air header 50 in rigid association therewith so that the rear extension 58 inclined for alignment with the rear wall 28 of the frame 10 will rest on a flanged edge 59 formed thereon for that purpose.

Air is conveyed to the header 50 by means of the fan 30 in that the interior of the frame 10 is on constant communication therewith, thereby forcing air through the tubular members or air tubes 38 to absorb heat from the steam traveling through the concentric passage 39. As a consequence, increased heat absorption is effected to the extent that the heat carrying medium is more effectively deprived of its energy radiated to the atmosphere of the room within which the radiator unit is placed or positioned. It is worthy of note that units of this type are placed near the ceilings of the rooms wherein they are employed so that the air header 50 will send heat collecting streams downwardly, although this arrangement may be varied depending upon the dictates of commercial practice. In the event that increased air circulation is desired either between the fins 26 and/or the air tubes 38, the fan 30 may be of larger diameter or moved upwardly in position to direct more air to the header 50. This expedient enables the use of larger diameter heat tubes 18 and further increases heat radiation to a maximum incident to the passage of the heat medium through the heat tubes for dissemination to the confined atmosphere of a room.

It has been found desirable to provide deflectors in the path of the heat medium within the concentric passage 39 so as to define a tortuous path therefor. To this end, fins or ridges 60 are provided at spaced intervals along the air tubes 38 to increase the radiating surface area thereof as well as to direct the steam or heat medium particles against the interior walls of the tubes 18 as indicated by arrows (b) (Figure 5). This imparts a turbulent motion to the steam so that every particle passing within the concentric passage 39 will touch the walls of the tubes 18 at some time or another incident to the passage thereof to the header 16.

The ridges or fins 60 may take a variety of forms, and the intermediate depressions 61 so shaped as to create the desired conditions conducive to the most efficient distribution of the steam during its passage from the header 15 to the header 16 and the air (c) directed through the tubes 38 to accumulate heat incident to the passage thereof. In order to provide increased radiation, the concentrically disposed tubes 18 and 38 may have the surfaces thereof deformed to provide alternately arranged annular ridges 60' and 62 on the confronting surfaces thereof (Figure 6). As a consequence, the air and steam passing interiorly and exteriorly of the axial tubes 38 will proceed therethrough with increased turbulency and decreased speed which is conducive to complete heat absorption from the heat medium. It is worthy of note that the tubes 18' may be provided with inclined rather than horizontal plates 26' or if desired such may be helically finned to conform with the particular type of ridges 62 impressed therein as commercial practice may dictate.

To more effectively circulate steam and air through their respective passages within the tubes 18'', either the air tube 61'' or heat tube 18'' or both may be formed with a helical ridge 60'' throughout the surface extent thereof, thereby defining a correspondingly pitched intermediate concavity 61'' to guide the vapor mediums along a tortuous path. The air and heat mediums will, therefore, traverse a decidedly increased distance at a decreased speed of travel so as to promote increased heat conduction to the surrounding surfaces of the tubes 18'' and 38''. This is carried to the confined atmosphere of a room by the air circulating therein and thereabout, since the fan 30 furnishes the necessary displacement for this purpose.

The fan 30 may be dispensed with in lieu of a natural air draft almost universally resorted to in domestic installations. Otherwise compressed air may be directed against and between the radiating fins or plates 26 as well as within the air header 50 for consequent passage through the tubes 38. This is especially efficacious in heating garages, since compressed air is available for such purpose without requiring special provisions therefor. Of course the fan 30 can be used for circulating air between the plates 26 in conjunction with the utilization of compressed air in the header 50 by piping a supply thereto for valved communication therewith.

It will be apparent that a novel and very effective expedient has been provided in an especially useful situation to materially increase the efficiency of known heating units which may be employed for domestic and commercial heating purposes. Although this invention has particular value in connection with heaters of the blower type, it may be advantageously employed in domestic units or commercial heaters in the absence of a fan circulator as particularly described hereinabove.

Various changes may be made in the embodiment of the invention herein specifically described without departing from or sacrificing any of the advantages of the invention as defined in the appending claims.

I claim:

1. In a heating device, the combination with a plurality of spaced heat tubes, a plurality of plates extending transversely of said tubes to constitute heat radiating surfaces therefor, means for conveying a heat medium through said tubes, and deflecting means interiorly of said tubes for directing thin films of said heat medium in contact with the walls thereof incident to the heat passage therethrough, thereby increasing the heat conduction to said plates.

2. In a heating device, the combination with a plurality of spaced heat tubes, a plurality of plates extending transversely of said tubes to constitute heat radiating surfaces therefor, means for conveying a heat medium through said tubes, deflecting means for directing thin films of said heat medium in contact with the walls of said tubes incident to the heat passage therethrough, thereby increasing the heat conduction to said plates, and means for establishing an air draft between said plates to carry the heat therefrom.

3. In a room heating unit, the combination with spaced intake and outlet headers, of spaced heat tubes disposed between said headers to establish communication therebetween, closely associated plates transversely secured to said heat tubes between said headers to serve as heat radiating surfaces, tubular members disposed axially within said heat tubes to form concentric passages therein for conveying the heat medium between said headers, an air header detachably associated with one of said heat tube headers, and a fan for circulating air between said plates and to said air header.

4. In a room heating unit, the combination with spaced intake and outlet headers, of spaced heat tubes disposed between said headers to establish communication therebetween, closely associated plates transversely secured to said heat tubes between said headers to serve as heat radiating surfaces, tubular members disposed axially within said heat tubes to form concentric passages therein for conveying the heat medium between said headers, and an air header in communication with said tubular members, for detachable association with one of said heat tube headers.

5. In a self contained room heating unit, the combination with spaced intake and outlet headers, of spaced heat tubes disposed between said headers to establish communication therebetween, closely associated plates transversely secured to said heat tubes between said headers to serve as heat radiating surfaces, tubular members disposed axially within said heat tubes to form concentric passages therein for conveying the heat medium between said headers, an air header in communication with said tubular members, and means for creating a flow of air through said air header and between said heat radiating plates.

6. In a room heating unit, the combination with spaced intake and outlet headers, of spaced heat tubes disposed between said headers to establish communication therebetween, and tubular exteriorly ribbed members disposed axially within said heat tubes to form concentric passages therein for conveying the heat medium between said headers.

7. In a heat conveying member, the combination with an elongated tube, of a tubular member disposed axially through said tube to define a shallow concentric heat passage therearound, deflecting means on the confronting surfaces of the concentric passage to define a tortuous heat path therethrough, and an air header detachably associated with said last named tubular member for communication therewith.

HARRY C. ALBERTS.